(12) United States Patent
Mori

(10) Patent No.: US 6,211,938 B1
(45) Date of Patent: Apr. 3, 2001

(54) APPARATUS FOR MANUFACTURING A PLURALITY OF LIQUID CRYSTAL PANELS USING PRESS AND PRESSURIZED REGIONS

(75) Inventor: Shigeru Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/151,521

(22) Filed: Sep. 11, 1998

(30) Foreign Application Priority Data

Sep. 18, 1997 (JP) .................................................. 9-253752

(51) Int. Cl.⁷ ...................................................... G02F 1/133
(52) U.S. Cl. .......................... 349/190; 349/154; 156/182; 156/109
(58) Field of Search .................................. 349/56, 60, 58, 349/74, 153, 190; 445/66; 156/109, 379.8, 382, 187

(56) References Cited

U.S. PATENT DOCUMENTS

| | | | |
|---|---|---|---|
| 5,326,420 | * 7/1994 | Vinouze et al. | 156/379 |
| 5,568,297 | * 10/1996 | Tsubota et al. | 349/153 |
| 5,629,787 | * 5/1997 | Tsubota et al. | 349/153 |
| 5,653,838 | * 8/1997 | Hwang et al. | 156/104 |
| 5,904,801 | * 5/1999 | Furukawa et al. | 156/382 |

FOREIGN PATENT DOCUMENTS

| | | |
|---|---|---|
| 63-163423 | 7/1988 | (JP) . |
| 4-147217 | 5/1992 | (JP) . |
| 6-194618 | 7/1994 | (JP) . |
| 6-337429 | 12/1994 | (JP) . |
| 6-347803 | 12/1994 | (JP) . |
| 7-43731 | 2/1995 | (JP) . |
| 7-104306 | 4/1995 | (JP) . |
| 7-199203 | 8/1995 | (JP) . |
| 8-69002 | 3/1996 | (JP) . |
| 11-7031 | 1/1999 | (JP) . |

OTHER PUBLICATIONS

Computer translation of JP6–194618.*
Computer translation of JP8–69002.*
Japanese Office Action, dated Aug. 31, 1999, with English language translation of Japanese Examiner's comments.

* cited by examiner

*Primary Examiner*—Kenneth Parker
(74) *Attorney, Agent, or Firm*—McGuireWoods, LLP

(57) ABSTRACT

A liquid crystal panel manufacturing apparatus includes jigs, a fluid press device, a mechanical press mechanism, and a heating unit. The jigs are stacked in a plurality of stages, arranged above and below the respective pair of substrates, and have O-rings at positions corresponding to portions on the thermosetting resin. The fluid pressurizing device introduces a pressure fluid into pressure regions defined by the O-rings, surfaces of the jigs, and surfaces of the substrates through inlet holes respectively formed in the jigs, to pressurize the substrates in units of pairs. The mechanical press mechanism entirely presses the plurality of pairs of substrates stacked alternately with the jigs. The heating unit heats and calcines the plurality of pairs of substrates pressed by the mechanical press mechanism. Adhered portions adhered with the thermosetting resin and a display portion of the liquid crystal cell are pressurized, in units of pairs of substrates, in a vertical direction with a uniform pressure.

10 Claims, 5 Drawing Sheets

APPARATUS FOR MANUFACTURING A PLURALITY OF LIQUID CRYSTAL PANELS USING PRESS AND PRESSURIZED REGIONS

BACKGROUND OF THE INVENTION

1. Field of the Invention

The present invention relates to a liquid crystal panel manufacturing apparatus, more particularly, to an apparatus for manufacturing a sheet constituting at least one empty liquid crystal cell by adhering a pair of substrates with a thermosetting resin as one process in the manufacture of a liquid crystal display element and, in more detail, to an apparatus for pressing a pair of substrates in the vertical direction with a uniform pressure.

2. Description of the Prior Art

FIG. 1 shows a first conventional liquid crystal panel manufacturing apparatus. According to this first prior art, fixing jigs 32 and 34, respectively, having recesses in their opposing inner surfaces are vertically arranged, and a pair of substrates 31 are clamped between the fixing jigs 32 and 34. A thermosetting resin 42 as an adhesive, which also serves as a spacer, is placed between the pair of substrates 31. A fluid from one supply source (not shown) is supplied to two, upper and lower pressure regions 36 surrounded by the upper and lower outer surfaces, respectively, of the pair of substrates 31 and the two recesses of the fixing jigs 32 and 34. The pair of substrates 31 are pressed against each other with the pressure of this fluid (see Japanese Unexamined Patent Publication No. 6-194618).

In the first prior art described above, the pair of substrates 31 are pressed by the fluid. In a second prior art shown in FIG. 2, pairs of substrates 31 and rubber sheets 44 each having a pressure plate 45 on the substrate side, are alternately stacked in a plurality of stages. A fluid is supplied into the respective rubber sheets 44 to inflate them, thereby pressing the plurality of pairs of substrates 31 (see Japanese Unexamined Patent Publication No. 6-194618). As a result, a uniform air gap can be obtained between each pair of substrates without distorting the substrates 31, while causing no warp in the substrates 31.

As shown in FIG. 3, an apparatus as a modification of the first prior art is also known. In this apparatus, projections 32a and 34a are formed, on surfaces of fixing jigs 32 and 34 that oppose substrates 31, at positions corresponding to a thermosetting resin 42 placed between the pair of substrates 31, to form pressure regions surrounded by the fixing jigs 32 and 34, the pair of substrates 31, and the annular projections 32a and 34a. A fluid from one supply source is supplied to the pressure regions to adjust the gap between the pair of substrates 31 with its pressure.

FIG. 4 shows an apparatus as a fourth prior art apparatus. In this apparatus, upper and lower elastic members 51 and 52 are formed on a pair of substrates 31. The upper and lower elastic members 51 and 52 are clamped by upper and lower pressure plates 53 and 54. The upper and lower pressure plates 53 and 54, the upper and lower elastic members 51 and 52, and the pair of substrates 31 form upper and lower hermetic chambers U and D. Compressed air from a compressed air source 56 is supplied to the upper and lower hermetic chambers U and D through a pressure control valve 55, to press the pair of substrates 31 (see Japanese Unexamined Patent Publication No. 7-104308). If the pressures in the upper and lower hermetic chambers U and D are different from each other, they are adjusted to be always equal to each other with the function of two, first and second air operator type pressure reducing valves 57 and 58 respectively communicating with the upper and lower hermetic chambers U and D. As a result, a uniform air gap can be obtained without distorting the pair of substrates 31, while causing no warp in the substrates 31.

In the first prior art, the number of substrates that can be processed at once is limited to a pair. To process a large amount of substrates, apparatuses corresponding in number to the number of substrates are required. As a result, the apparatuses become very large as a whole, which is not suitable for mass production.

In the second prior art using the rubber sheets, when the rubber sheets are inflated with the fluid, they do not inflate in parallel to the substrates but inflate like a convex lens. As a result, a pressure is applied to the substrates only locally, and the cell gap becomes nonuniform.

Furthermore, in the third and fourth prior arts, the number of substrates that can be processed at once is limited to a pair. To process a large amount of substrates, apparatuses corresponding in number to the number of substrates are required. As a result, the apparatuses become very large as a whole, which is not suitable for mass production.

SUMMARY OF THE INVENTION

The present invention has been made in consideration of the above situation in the prior arts and, has as one of its object to provide a liquid crystal panel manufacturing apparatus with which a uniform cell gap can be obtained between a pair of substrates adhered to each other without distorting them, while causing no warp in the substrates, and which can process a large number of substrates at once.

In order to achieve above object, according to the one aspect of the present invention, there is provided a liquid crystal panel manufacturing apparatus for manufacturing a plurality of liquid crystal panels, having at least one empty liquid crystal cell, at once by adhering a plurality of pairs of substrates stacked in a vertical direction such that each of the plurality of pairs of substrates are adhered with a thermosetting resin, comprising jigs stacked in a plurality of stages, arranged above and below the respective pairs of substrates, and having O-rings at positions corresponding to portions on the thermosetting resin, fluid pressurizing means for introducing a pressure fluid into pressure regions defined by the O-rings, surfaces of the jigs, and surfaces of the substrates through inlet holes respectively formed in the jigs, to pressurize the substrates in units of pairs, a mechanical press mechanism for entirely pressing the plurality of pairs of substrates stacked alternately with the jigs, and heating means for heating and calcining the plurality of pairs of substrates pressed by the mechanical press mechanism, wherein adhered portions adhered with the thermosetting resin and a display portion of the liquid crystal cell are pressurized, in units of pairs of substrates, in a vertical direction with a uniform pressure.

The O-rings in the major aspect are arranged to correspond to the portions on the thermosetting resin located at outermost portions of the respective substrate pairs, or are arranged on and/or outside the thermoset resin.

The inlet holes in the major aspect are connected to a pressure fluid source through connection pipes arranged in units of jigs, or through one connection pipe extending through the respective jigs.

The pressure fluid in the major aspect is a gas or a hot liquid.

In the liquid crystal panel manufacturing apparatus according to the present invention, when manufacturing a liquid crystal panel constituting at least one empty liquid crystal cell by adhering a pair of substrates with a thermosetting resin, the pair of substrates are pressed with the press mechanism through the upper and lower jig. The thermoset resin is set by hot air introduced into the heating unit through the hot air inlet holes. The display portion of the liquid crystal panel is pressurized by air or other fluid introduced through the air inlet holes extending through the jigs.

In this manner, according to the present invention, the following effects are obtained.

According to the first effect, since a pair of substrates adhered to each other are pressed with a uniform pressure, a uniform gap can be obtained without distorting them, while causing no warp in the substrates. As a result, a liquid crystal panel having a uniform cell gap can be manufactured. As a result, display variations caused by a nonuniform gap does not occur in the liquid crystal panel.

According to the second effect, since jigs and pairs of substrates are stacked in a plurality of stages, a large number of substrates can be processed at once, to enhance the mass production effect.

The above and many other objects, features and advantages of the present invention will become manifest to those skilled in the art upon making reference to the following detailed description and accompanying drawings in which preferred embodiments incorporating the principles of the present invention are shown by way of illustrative examples.

DETAILED DESCRIPTION OF THE PREFERRED EMBODIMENTS

A liquid crystal panel manufacturing apparatus of the present invention will be described by way of its preferred embodiments with reference to the accompanying drawings.

A first embodiment of the liquid crystal panel manufacturing apparatus according to the present invention will be described with reference to FIG. 5, which is a schematic sectional view.

Figure 1:
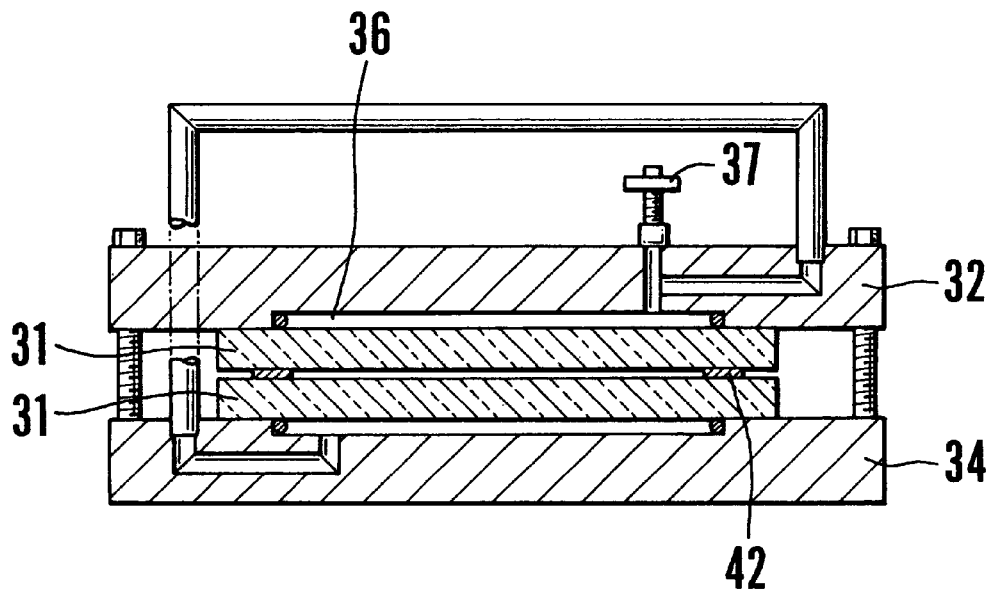
FIG. 1 is a schematic sectional view showing the first prior art.
Figure 3:
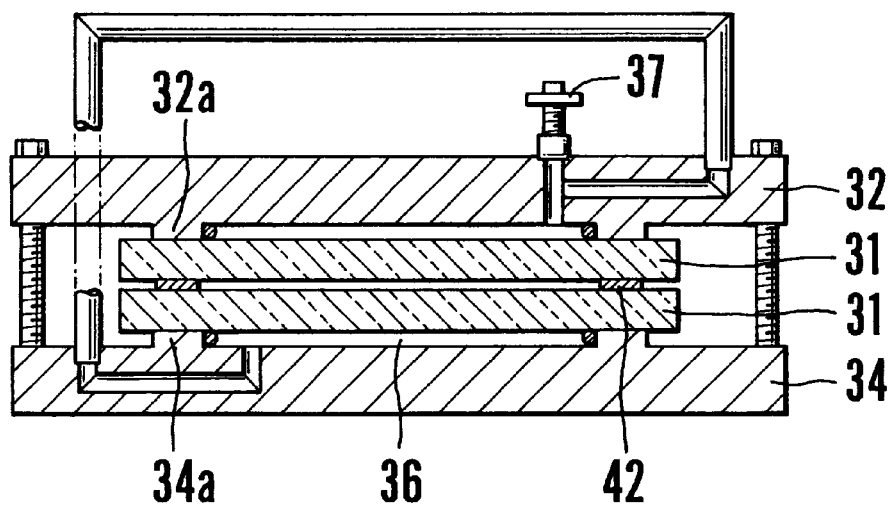
FIG. 3 is a schematic sectional view showing a modification of the first prior art.
Figure 2:
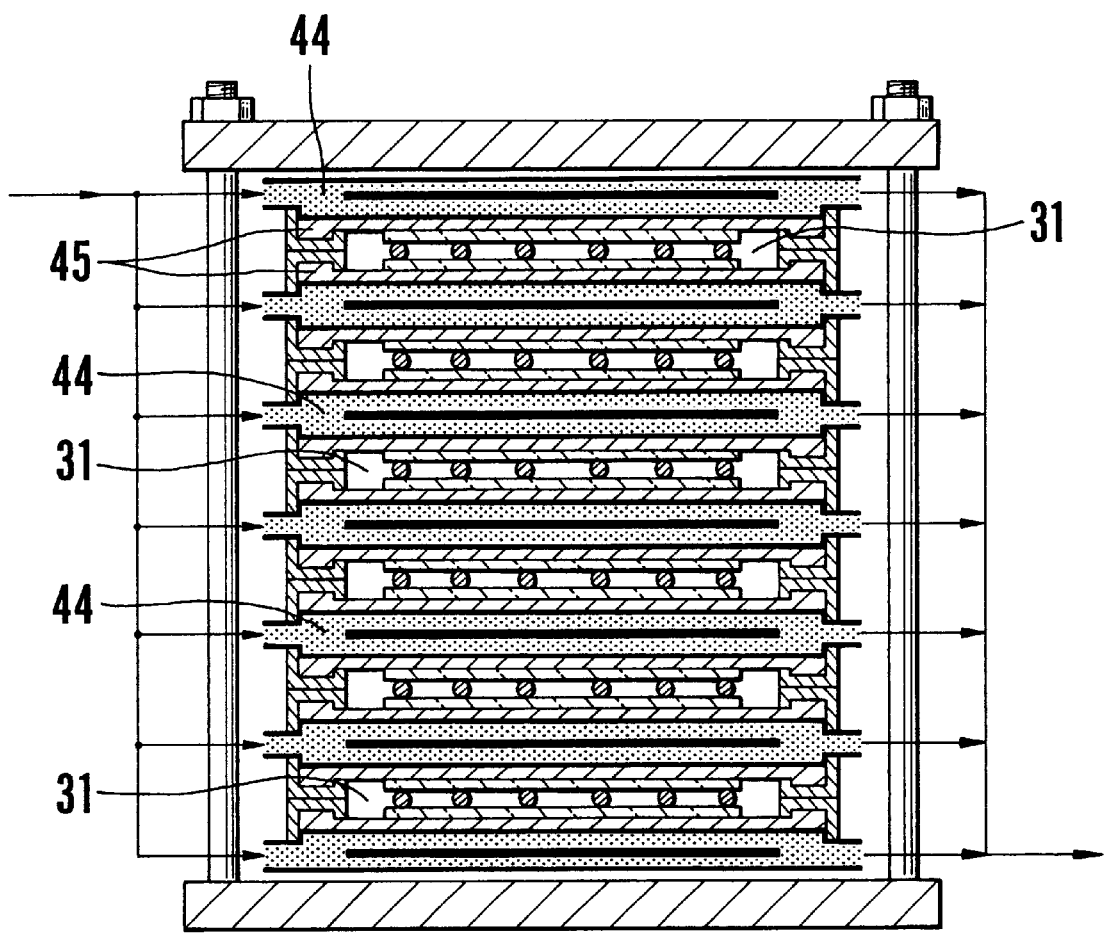
FIG. 2 is a schematic sectional view showing the second prior art.
Figure 4:
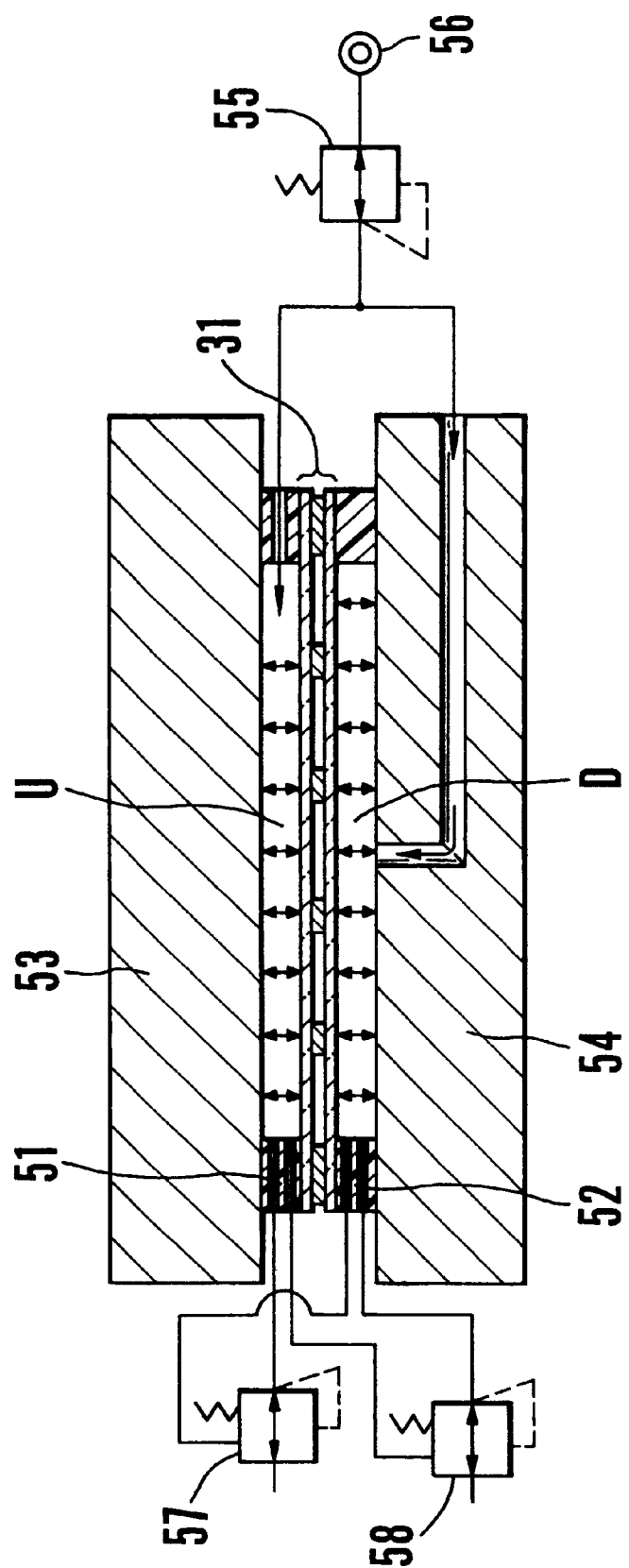
FIG. 4 is a schematic sectional view showing the fourth prior art.
Figure 5:
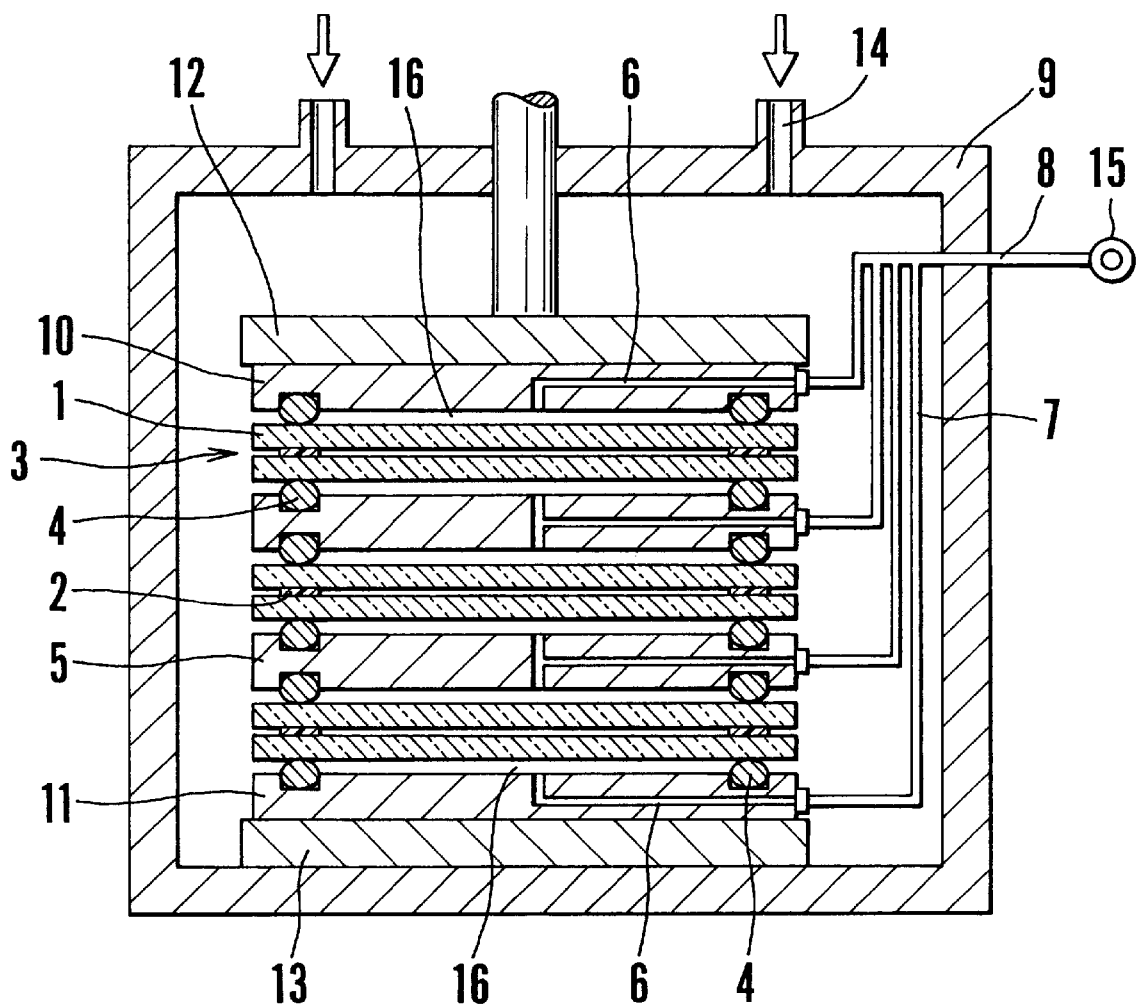
FIG. 5 is a schematic sectional view showing a liquid crystal panel manufacturing apparatus according to the first embodiment of the present invention.

Referring to FIG. 5, pairs of substrates 1 are made of an organic substance or glass. A thermosetting resin 2 is made of an organic substance. Each liquid crystal panel 3 is constituted by the pair of substrates 1. O-rings 4 are made of an organic substance. Interposed jigs 5 are made of a metal. Air inlet holes 6 extend through the interposed jigs 5. The O-rings 4 are arranged on the upper and lower ends of the interposed jig 5. An upper jig 10 is located at the uppermost porion and has a flat upper surface to uniformly receive pressure from a press plate 12. A lower jig 11 is located at the lowermost portion and has a flat lower surface. The lower jig 11 is arranged on a table 13. The air inlet holes 6 extend through the interposed jigs 5, the upper jig 10, and the lower jig 11 to supply air or any other fluid to the outer surfaces of the pair of substrates 1. Connection pipes 7 are made of an organic substance and connect the air inlet holes 6 with an air inlet pipe 8 made of an organic substance. An oven 9 is made of a metal. The press plate 12 is made of a metal and presses the pair of substrates 1, the upper jig 10, the interposed jigs 5, and the lower jig 11. The table 13 is made of a metal and arranged under the pair of substrates 1, the upper jig 10, the interposed jigs 5, and the lower jig 11. Hot air inlet holes 14 are made of a metal and supply hot air into the oven 9.

The operation of the liquid crystal panel manufacturing apparatus according to the present invention will be described with reference to FIG. 5.

The liquid crystal panel manufacturing apparatus has, on the table 13 in oven 9, the lower jig 11 for placing thereon the pair of substrates 1. Of this pair of substrates 1, the surface of one substrate is annularly printed with the thermosetting resin 2, and this substrate is stacked on the other substrate. The lower jig 11 has, on its upper surface, the O-ring 4 arranged at a position corresponding to the outermost thermosetting resin 2 within the pair of substrates 1, and the air inlet hole 6 to feed air onto the surfaces (the display surface of the liquid crystal panel) of the pair of substrates 1 for pressurization. The O-rings 4 are formed also on the interposed jigs 5 and the upper jig 10 to be described later. The air inlet holes 6 are formed also in the interposed jigs 5 and the upper jig 10 to be described later. Through the corresponding connection pipes 7, the air inlet holes 6 feed compressed air from a supply source 15 onto the surfaces of the corresponding pairs of substrates 1 through the air inlet pipe 8.

The interposed jig 5 is arranged above each pair of substrates 1. The interposed jig 5 has the O-rings 4, identical to that of the lower jig 11, on its upper and lower surfaces. The O-ring 4 is arranged to correspond to the outermost thermosetting resin 2 within the pair of substrates 1. Furthermore, pairs of substrates 1 and the interposed jigs 5 are alternately stacked, and the upper jig 10 is arranged on the uppermost pair of substrates 1. The upper jig 10 has an O-ring 4 on its lower surface. This O-ring 4 is arranged to correspond to the outermost thermosetting resin 2 within the pair of substrates 1.

The press plate 12 is arranged on the upper jig 10. The press plate 12 presses members, ranging from the upper jig 10 to the lower jig 11, with a predetermined pressure. The oven 9 has the hot air inlet holes 14. Heated air flows into the oven 9 through the hot air inlet holes 14 to heat the interior of the oven 9 to a predetermined temperature.

With this arrangement, the respective pairs of substrates 1 can be pressed with a uniform surface pressure with compressed air or the like introduced into pressure ranges 16 defined by the upper jig 10, the interposed jig 5, or the lower jig 11, the surfaces of the respective pairs of substrates, and the O-rings 4, while pressing the plurality of pairs of stacked substrates 1 by the press plate 12 with a predetermined pressure. Accordingly, a liquid crystal panel having a uniform cell gap can be formed, while display variations caused by a nonuniform cell gap of the liquid crystal panel does not occur. Since the jigs and the pairs of substrates are stacked in a plurality of stages, a large number of pairs of substrates can be processed at once, to obtain a high mass production effect.

The first embodiment of the present invention will be described in more detail with reference to FIG. 5.

The substrates 1 are constituted by 0.7-mm thick, 470-mm wide, 370-mm deep non-alkali glass plates and have a cell gap of 5 $\mu$m. The thermosetting resin 2 is made of an epoxy resin, and is printed on the peripheries of the inner surfaces of each pair of substrates 1 at positions 3 mm inward the respective side ends of one substrate, to be continuous in the circumferential direction.

The O-rings 4 are constituted by 2-mm diameter silicone rubber members. The interposed jigs 5 are constituted by 2-mm or more thick, 470-mm wide, and 370-mm deep aluminum plates. A 0.5-mm diameter air inlet hole extends through each interposed jig 5. The O-rings 4 are arranged on the upper and lower ends of the interposed jigs 5. To arrange the O-rings, 2-mm wide, 1-mm or less deep grooves are formed in the upper and lower surfaces of the interposed jigs 5 at positions 3 mm inward from the respective sides, to be continuous in the circumferential direction.

The upper jig 10 is located at the uppermost portion and is constituted by a 2-mm thick, 470-mm wide, and 370-mm deep aluminum plate having a flat upper surface so that it can uniformly receive the pressure from the press plate 12. To arrange the O-ring, a 2-mm wide, 1-mm deep groove is formed, at a position 3 mm inward from the respective sides, in the lower surface of the upper jig 10, to be continuous in the circumferential direction.

The lower jig 11 is located at the lowermost portion, is constituted by a 2-mm thick, 470-mm wide, 370-mm deep aluminum plate having a flat lower surface, and is arranged on the table 13. To arrange the O-ring, a 2-mm wide, 1-mm deep groove is formed, at a position 3 mm inward from the respective sides, in the upper surface of the lower jig 11, to be continuous in the circumferential direction.

The air inlet holes 6 have a diameter of 0.5 mm and extend through the interposed jigs 5, the upper jig 10, and the lower jig 11, respectively, to supply air or any other fluid to the pressure regions formed on the outer surfaces of the pair of substrates 1. The connection pipes 7 are made of Teflon and connect the air inlet holes 6 with the air inlet pipe 8, made of silicone rubber and having an outer diameter of 1.5 mm and an inner diameter of 0.5 mm, to each other. The oven 9 is made of stainless steel.

The press plate 12 is made of iron, has a width of 470 mm and a depth of 370 mm, and uniformly presses the pair of substrates 1, the upper jig 10, the interposed jigs 5, and the lower jig 11 with a pressure of 0.6 kg/cm$^2$.

The table 13 is made of iron, has a width of 470 mm and a depth of 370 mm, and is arranged below the pair of substrates 1, the upper jig 10, the interposed jigs 5, and the lower jig 11. The oven 9 heats the pair of substrates 1 and the like with hot air supplied through the hot air inlet holes 14.

Referring to FIG. 5, the liquid crystal panel manufacturing apparatus according to the present invention has the aluminum lower jig 11 having a width of 470 mm, a depth of 370 mm, and a thickness of 2 mm on the iron table 13 in the stainless steel oven 9, and the pair of substrates 1 are placed on the lower jig 11. The pair of substrates 1 are constituted by a 470-mm wide, 370-mm deep, 0.7-mm thick active element and a resin color filter. An aligning film is formed on the upper surface of the active element, and resin beads each having a diameter of 5 $\mu$m are dispersed on the aligning film to form one substrate. A thermosetting resin made of an epoxy resin is annularly printed for a width of 0.4 mm and a height of 20 $\mu$m in the peripheral portion of this substrate, at a position 3 mm inward the respective sides of the substrate. This substrate is stacked on a color filter substrate, obtained by forming an aligning film on the 470-mm wide, 370-mm deep, and 0.7-mm thick resin color filter to constitute a liquid crystal panel.

The 2-mm diameter silicone rubber O-ring 4 is arranged on the upper surface of the lower jig 11 to correspond to the printed position of the thermosetting resin 2. The lower jig 11 has the 0.5-mm diameter air inlet hole 6 for sending air onto the surfaces of the pair of substrates 1 in order to pressurize them. The interposed jigs 5 and the upper jig 10 to be described later also have the O-rings 4.

The interposed jigs 5 and the upper jig 10 to be described later also have the air inlet holes 6. Through the connection pipes 7, these air inlet holes 6 feed compressed air into the pressure regions, formed on the surfaces of the respective pairs of substrates 1, with a pressure of 0.5 kg/cm$^2$ through the silicone rubber air inlet pipe 8 having an outer diameter of 1.5 mm and an inner diameter of 0.5 mm. Therefore, the respective pairs of substrates 1 are pressed uniformly with a pressure of 0.5 kg/cm$^2$.

The 470-mm wide and 370-mm deep aluminum interposed jig 5 is arranged above the pair of substrates 1. The interposed jig 5 has the O-rings 4 on its upper and lower surfaces, in the same manner as the lower jig 11 does. The O-rings 4 are placed to correspond to the thermosetting resin 2 annularly printed on the pair of substrates 1 at a position 3 mm inward from their respective sides to be continuous in the circumferential direction.

The pairs of substrates 1 and the interposed jigs 5 are stacked alternately, and the upper jig 10 is arranged on the uppermost pair of substrates 1. The O-ring 4 is arranged on the lower surface of the upper jig 10. This O-ring 4 is arranged to correspond to the thermosetting resin 2. The press plate 12 for pressing the pair of substrates 1, the upper jig 10, the interposed jigs 5, and the lower jig 11 with a pressure of 0.6 kg/cm$^2$ is provided on the upper jig 10, to press members ranging from the upper jig 10 to the lower jig 11.

Hot air was introduced into the oven 9 through the hot air inlet holes 14 to heat the interior of the oven 9 to 160° C. After the interior of the oven 9 was heated at 160° C. for one hour, air supply from the hot air inlet holes 14 was stopped, air pressurization from the air inlet holes 6 was stopped, and pressurization of the press plate 12 was canceled. A total of 20 pairs of substrates 1 were extracted. Liquid crystal panels 3, each constituted by stacked substrates having a uniform cell gap of 5 $\mu$m±0.1 $\mu$m, were obtained.

Thereafter, the obtained liquid crystal panel was cut into a predetermined size. A liquid crystal material was injected into the cell gap, and the injection hole was sealed. Polarizing plates were adhered to the two surfaces of the liquid crystal panel, thus forming a liquid crystal display device.

As a modification of the embodiment of the present invention described above, an O-ring 4 may be placed on and/or outside the thermosetting resin 2 located at the outermost portion of the pair of substrates 1. When the O-ring 4 is placed on and/or outside the thermosetting resin 2 in this manner, the thickness of the thermosetting resin 2 can be set uniform.

A liquid crystal panel manufacturing apparatus according to second embodiment of the present invention will be described with reference to FIG. 6.

Figure 6:
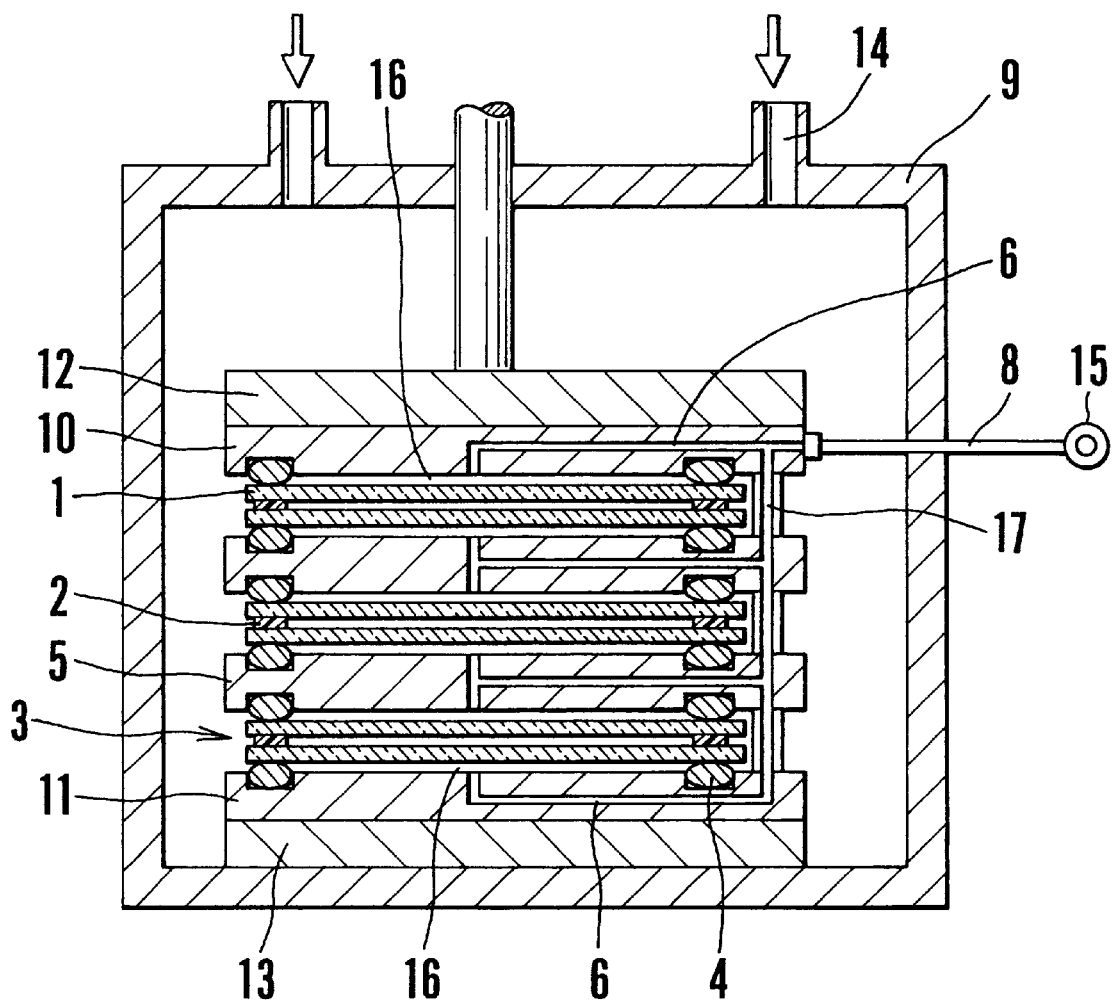
FIG. 6 is a schematic sectional view showing a liquid crystal panel manufacturing apparatus according to the second embodiment of the present invention.

FIG. 6 is a schematic sectional view of the liquid crystal panel manufacturing apparatus, in the same manner as FIG. 5. As is apparent from FIG. 6, air inlet holes 6 extending through the respective jigs, and an air inlet pipe 8 are connected to each other through one connection pipe 17.

According to this embodiment, unlike in the embodiment described above, connection pipes 7 corresponding in number to the air inlet holes 6 are not required, and accordingly a space for such connection pipes 7 is not required in the oven 9, so that the oven 9 can be downsized.

What is claimed is:

1. A liquid crystal panel manufacturing apparatus for simultaneously manufacturing a plurality of liquid crystal panels, each having a liquid crystal cell, by adhering a plurality of pairs of substrates stacked in a vertical direction such that each of the plurality of pairs of substrates are adhered with a thermosetting resin, comprising:

jigs stacked in a plurality of stages, said jigs including:
(a) an upper jig and a lower jig respectively arranged above and below said plurality of pairs of substrates, each of said plurality of pairs of substrates corresponding to one of said liquid crystal panels, and
(b) at least one interposed jig, said at least one interposed jig and said plurality of pairs of substrates being alternately disposed between said upper jig and said lower jig;

O-rings at positions corresponding to portions on said thermosetting resin;

fluid pressurizing means for introducing a pressure fluid into pressure regions defined by said O-rings, surfaces of said jigs, and surfaces of said substrates through holes respectively formed in said jigs, to pressurize said substrates in units of pairs;

a mechanical press mechanism for entirely pressing said plurality of pairs of substrates stacked alternately with said at least one interposed jig; and heating means for heating and calcining said plurality of pairs of substrates pressed by said mechanical press mechanism, wherein adhered portions adhered with said thermosetting resin and a display portion of said liquid crystal cell are pressurized, in units of pairs of substrates, in a vertical direction with a uniform pressure.

2. An apparatus according to claim 1, wherein said O-rings are arranged to correspond to said portions on said thermosetting resin located at outermost portions of said substrates.

3. An apparatus according to claim 1, wherein said O-rings are arranged on and/or outside said thermosetting resin, located at outermost portions of said substrates, to correspond thereto.

4. An apparatus according to claim 1, wherein holes are connected to a pressure fluid source through connection pipes arranged in units of jigs.

5. An apparatus according to claim 1, wherein holes are connected to a pressure fluid source through one connection pipe extending through said respective jigs.

6. An apparatus according to claim 1, wherein said pressure fluid is a gas.

7. An apparatus according to claim 1, wherein said pressure fluid is a hot liquid.

8. An apparatus according to claim 1, wherein the liquid crystal cells in said liquid crystal panels are empty when pressed by said mechanical press mechanism.

9. An apparatus according to claim 1, wherein said jigs are jig plates, said holes in each of said jig plates forming channels for transporting said pressure fluid from an inlet to at least one outlet leading to a respective one of said pressure regions.

10. An apparatus according to claim 9, wherein said jig plates are metal plates.

* * * * *